US012732821B2

(12) United States Patent
Swaminathan et al.

(10) Patent No.: US 12,732,821 B2
(45) Date of Patent: Sep. 8, 2026

(54) CONTROLLING AN INTERACTION USING LOCATION-BASED INDICATORS

(71) Applicant: Truist Bank, Charlotte, NC (US)

(72) Inventors: Sudhakar Swaminathan, Duluth, GA (US); Chad Elley, Smyrna, GA (US)

(73) Assignee: Truist Bank, Charlotte, NC (US)

( * ) Notice: Subject to any disclaimer, the term of this patent is extended or adjusted under 35 U.S.C. 154(b) by 483 days.

(21) Appl. No.: 18/332,407

(22) Filed: Jun. 9, 2023

(65) Prior Publication Data

US 2024/0414546 A1 Dec. 12, 2024

(51) Int. Cl.
*H04W 12/63* (2021.01)
*H04W 12/06* (2021.01)

(52) U.S. Cl.
CPC ........... *H04W 12/63* (2021.01); *H04W 12/06* (2013.01)

(58) Field of Classification Search
CPC ..... H04W 12/63; H04W 48/04; H04W 12/64; H04W 12/00; H04W 12/06; H04W 12/12; H04W 12/128; H04L 63/107; H04L 63/1425; G06Q 20/4016; G06Q 20/40; G06Q 30/0185; G06F 21/32
See application file for complete search history.

(56) References Cited

U.S. PATENT DOCUMENTS

2012/0209773 A1* 8/2012 Ranganathan ......... G06Q 20/40 705/44
2013/0231137 A1* 9/2013 Hugie .................. H04W 4/021 455/456.3
2019/0258818 A1* 8/2019 Yu .......................... G06F 21/44
2021/0058383 A1* 2/2021 Colon .................. H04W 12/61
2021/0312451 A1* 10/2021 Allbright .............. G06N 20/00

OTHER PUBLICATIONS

Yousefi et al., âA Comprehensive Survey on Machine Learning Techniques and User Authentication Approaches for Credit Card Fraud Detectionâ [retrieved on Aug. 29, 2025] <https://arxiv.org/pdf/1912.02629> (Year: 2019).*

* cited by examiner

*Primary Examiner* — Jinsong Hu
*Assistant Examiner* — Justin Barry
(74) *Attorney, Agent, or Firm* — Kilpatrick Townsend & Stockton LLP; Michael A. Springs, Esq.

(57) ABSTRACT

A system can be used to control an interaction using location-based indicators. The system can receive an interaction request associated with a geographical location and that can be initiated by an entity approximately at the geographical location. In response, the system may identify a request restriction of a security profile of the entity by executing an interaction processing service. The system can use the request restriction to identify an authorized geographical location of one or more geographical locations. In response to determining that the geographical location of the interaction request is not consistent with the authorized geographical location based on the request restriction, the system can challenge the interaction of the interaction request. In response to determining that the geographical location of the interaction request is consistent with the authorized geographical location based on the request restriction, the system can initiate the interaction of the interaction request.

15 Claims, 3 Drawing Sheets

300

302
Receive an interaction request associated with a geographical location, the interaction request being initiated by an entity approximately at the geographical location 304
In response to receiving the interaction request, identify a request restriction associated with a security profile of the entity by executing an interaction processing service, the request restriction being usable to identify an authorized geographical location of a plurality of geographical locations 306
In response to determining that the geographical location of the interaction request is not consistent with the authorized geographical location based on the request restriction, challenge an interaction associated with the interaction request 308
In response to determining that the geographical location of the interaction request is consistent with the authorized geographical location based on the request restriction, initiate the interaction associated with the interaction request

*FIG. 3*

CONTROLLING AN INTERACTION USING LOCATION-BASED INDICATORS

TECHNICAL FIELD

The present disclosure relates to authentication within computer systems and, more particularly (although not necessarily exclusively), to controlling an interaction using location-based indicators.

BACKGROUND

Authentication can be a function of modern-day computer systems to secure confidential information in the computing systems. Due to the confidential nature of the information, a user may be authenticated before being granted access to confidential information. Authentication may involve determining the user is an owner of the information or is entitled to access the information. For example, and in certain instances, the service provider can allow the user to access the confidential information.

SUMMARY

In one example, a system can receive an interaction request associated with a geographical location. The interaction request can be initiated by an entity approximately at the geographical location. In response to receiving the interaction request, the system can identify a request restriction associated with a security profile of the entity by executing an interaction processing service. The request restriction can be used to identify an authorized geographical location of a plurality of geographical locations. In response to determining that the geographical location of the interaction request is not consistent with the authorized geographical location based on the request restriction, the system can challenge an interaction associated with the interaction request. In response to determining that the geographical location of the interaction request is consistent with the authorized geographical location based on the request restriction, the system can initiate the interaction associated with the interaction request.

In another example, an interaction request associated with a geographical location can be received. The interaction request can be initiated by an entity approximately at the geographical location. A request restriction associated with a security profile of the entity can be identified, in response to receiving the interaction request, by executing an interaction processing service. The request restriction can be used to identify an authorized geographical location of a plurality of geographical locations. An interaction associated with the interaction request can be challenged in response to determining that the geographical location of the interaction request is not consistent with the authorized geographical location based on the request restriction. The interaction associated with the interaction request can be initiated in response to determining that the geographical location of the interaction request is consistent with the authorized geographical location based on the request restriction.

In a further example, a non-transitory computer-readable medium can include program code that is executable by a processing device for causing the processing device to perform various operations. An interaction request associated with a geographical location can be received. The interaction request can be initiated by an entity approximately at the geographical location. A request restriction associated with a security profile of the entity can be identified, in response to receiving the interaction request, by executing an interaction processing service. The request restriction can be used to identify an authorized geographical location of a plurality of geographical locations. An interaction associated with the interaction request can be challenged in response to determining that the geographical location of the interaction request is not consistent with the authorized geographical location based on the request restriction. The interaction associated with the interaction request can be initiated in response to determining that the geographical location of the interaction request is consistent with the authorized geographical location based on the request restriction.

BRIEF DESCRIPTION OF THE DRAWINGS

FIG. 3 is a flowchart of a process for controlling an interaction using location-based indicators according to one example of the present disclosure.

DETAILED DESCRIPTION

Figure 1:
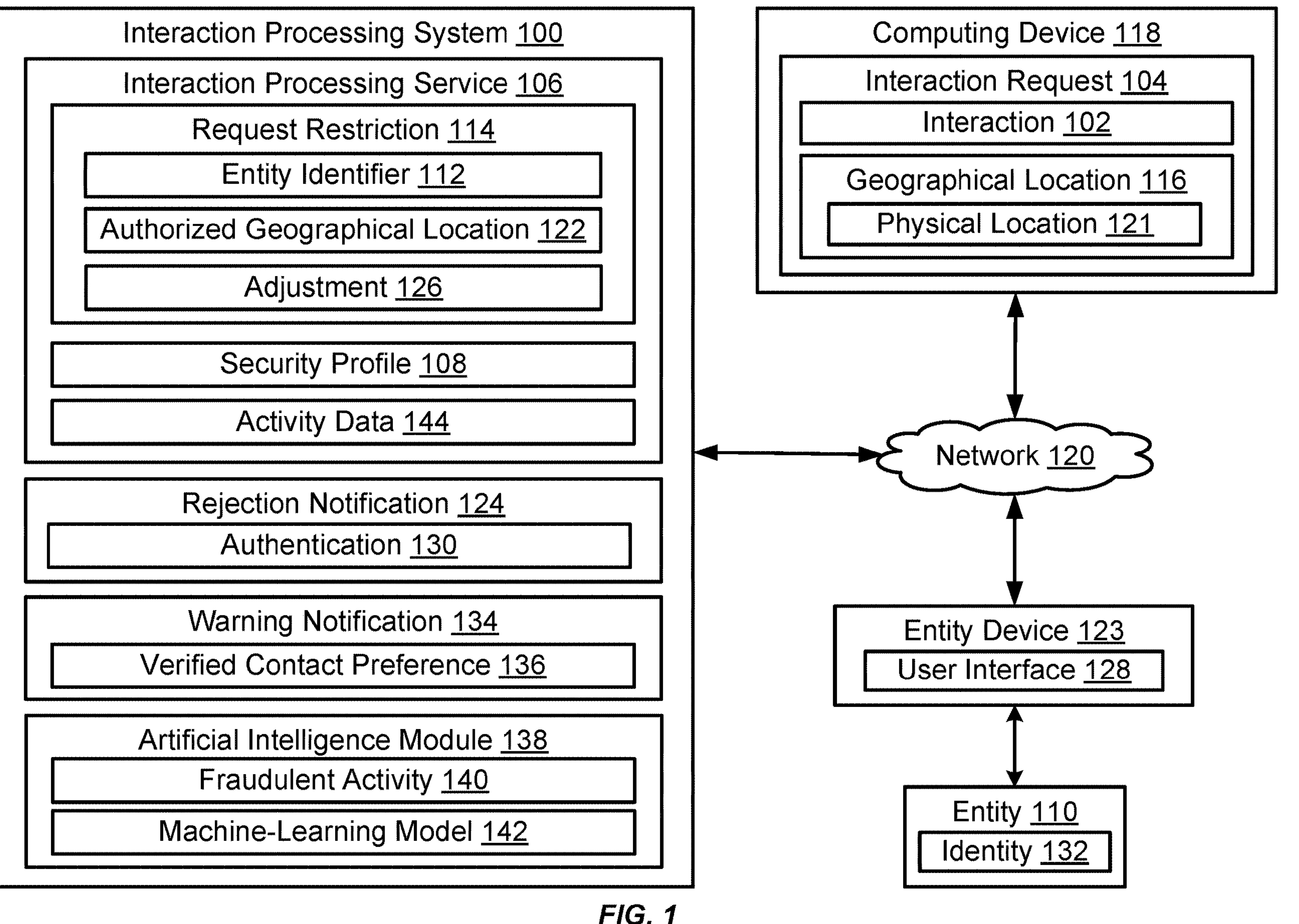
FIG. 1 is a block diagram of an example of an interaction processing system for controlling an interaction using location-based indicators according to one aspect of the present disclosure.

Certain aspects and features relate to controlling an interaction using location-based indicators to authenticate an interaction request associated with the interaction. The interaction can involve a transfer of data or resources between entities. An interaction processing system can receive the interaction request that can be initiated by an entity approximately at a geographical location. The interaction processing system can include an interaction processing service to authenticate the interaction request by determining whether the interaction request is authorized. The interaction processing service can use the location-based indicators that may indicate an authorized geographical location to determine authorization of the interaction request. For example, a location-based indicator may indicate that the geographical location of the interaction request is consistent with the authorized geographical location. In some examples, the interaction processing service may identify the geographical location of the interaction request using metadata included in the interaction request. Additionally or alternatively, the interaction processing system may tag the interaction request with a suitable location-based indicator to indicate the geographical location once the interaction processing system receives the interaction request. If the interaction request is authorized, the interaction processing system can initiate the interaction associated with the interaction request. Alternatively, if the interaction request is determined to be unauthorized, the interaction processing system may challenge or deny the interaction associated with the interaction request.

The interaction processing service of the interaction processing system can use the location-based indicator to generate a request restriction to determine authorization indicated by the entity with respect to one or more geographical locations. For example, the request restriction may be a rule set that can include one or more instructions used to determine allowability of the interaction requests. The interaction processing service can access a security profile of the entity to determine whether a request restriction that restricts interaction requests with respect to the geographical location is present in the security profile of the entity. In some examples, the security profile can group a set of request restrictions based on the set of request restrictions being associated with the entity. The interaction processing system can include a unique entity identifier for each entity to identify a respective security profile. Once the interaction processing system identifies the security profile of the entity, the interaction processing system can search the set of request restrictions in the security profile to identify a suitable request restriction to apply to the interaction request. In some examples, the set of request restrictions may be unapplicable to the interaction request such that the interaction processing system can proceed with initiating the interaction of the interaction request.

If the interaction processing service identifies a request restriction of the security profile that may restrict authorization with respect to the geographical location, the interaction processing system may challenge the interaction of the interaction request. In some examples, the interaction processing system may outright deny the interaction or interaction request after challenging the interaction. In other examples, the interaction processing system may request additional verification from the entity to verify an identity of the entity. If the interaction processing system can verify the identity of the entity, the interaction processing system may initiate the interaction. Alternatively, if the interaction processing system is unable to use the additional verification to verify the identity of the entity, the interaction processing system may reject the interaction or interaction request.

Accordingly, using the request restriction to restrict authorization of the interaction request can prevent an unauthorized interaction from being initiated by the interaction processing system. Additionally, restricting authorization of the interaction request can improve information security by preventing unauthorized access to protected resources. In some examples, a malicious actor may use a computing system to fraudulently generate an interaction request using sensitive data corresponding to the entity. For example, the malicious actor can use the sensitive data to impersonate the entity at a physical location or through communication channels, such as an interactive voice response system. The malicious actor may gather the sensitive data over time, for example by intercepting personal information shared on unsecured networks, using social engineering, or any combination thereof. For example, if the malicious actor uses social engineering to obtain the sensitive data, the malicious may implement pretexting to obtain personal information from the entity or from a service provider protecting the sensitive data. Examples of the sensitive data can include names, address, email addresses, login identifiers, geolocation information, driver's license numbers, biometric information, or other personally identifiable information.

Due to security concerns of the malicious actor fraudulently generating the interaction request, the interaction processing system can use the request restriction indicated by the entity to authenticate interaction requests with respect to a respective geographical location of the interaction requests. In some examples, the interaction processing system may challenge an interaction request initiated by the entity based on the request restriction indicated by the entity. In such examples, the entity may have used the request restriction to indicate a lack of authorization for certain geographical locations and forgotten to adjust the request restriction prior to initiating the interaction request.

Thus, the interaction processing system can address vulnerabilities in physical channels by restricting access to protected resources using the request restriction. Additionally, the interaction processing system can dynamically apply adjustments to the request restriction from the entity, enabling personalized security protections. In some examples, the interaction processing system may alert the entity in response to challenging an interaction request, enabling the entity to adjust the request restriction to allow the challenged interaction request. For example, if the request restriction was initiated by the entity but the request restriction was mistakenly left enabled, the entity can adjust the request restriction to allow the interaction request. Once the request restriction is adjusted, the interaction processing system can detect this adjustment and initiate the interaction of the interaction request.

These illustrative examples are given to introduce the reader to the general subject matter discussed here and are not intended to limit the scope of the disclosed concepts. In the following description, for the purposes of explanation, specific details are set forth in order to provide a thorough understanding of various implementations and examples. Various implementations may be practiced without these specific details. The figures and description are not intended to be restrictive.

FIG. 1 is a block diagram of an example of an interaction processing system 100 for controlling an interaction 102 using location-based indicators to authenticate an interaction request 104 associated with the interaction 102 according to one aspect of the present disclosure. Examples of the interaction 102 can include retrieving requested resources, such as data from a database, or performing a requested function. The interaction processing system 100 can be a computing system that can facilitate a processing of interaction requests and improve data security by monitoring the interaction requests for unauthorized interaction requests. The interaction requests processed by the interaction processing system 100 can be associated with one or more entities, such as users, organizations, or devices.

The interaction processing system 100 can include an interaction processing service 106 that can determine whether the interaction request 104 is authorized or allowable. The interaction processing service 106 can access a security profile 108 associated with an entity 110 to determine authorization of the interaction request 104. For example, the interaction processing service 106 may determine the security profile 108 of the entity 110 using an entity identifier 112 associated with the entity 110. In some examples, the security profile 108 can include a request restriction 114 that can indicate the authorization associated with the interaction request 104, for example with respect to the location-based indicators. The request restriction 114 can be implemented as a rule set, decision table, control table, decision tree, or any combination thereof. For example, the request restriction 114 may restrict the authorization of the interaction request 104 based on where the interaction request 104 was generated or from where the interaction request 104 was transmitted. In some examples, the security profile 108 may include more than one request restriction 114 such as a respective request restriction for each access point that a malicious actor may exploit to access protected resources associated with the entity 110. For example, an access point may correspond to a communication channel such that a respective request restriction may be associated with restricting the interaction request 104 with respect to an originating source of the interaction request 104.

The interaction processing system 100 can receive the interaction request 104 that can be initiated by the entity 110 approximately at a geographical location 116, for example using a computing device 118 positioned approximately at the geographical location 116. Examples of the computing device 118 can include a mobile device, computer, tablet, or automated teller machine (ATM). In some examples, the geographical location 116 of the computing device 118 can include a request center that can facilitate generating the interaction request 104 or initiating the interaction 102. For example, a worker of the request center can initiate an interaction 102 based on an interaction request 104 initiated by the entity 110 approximately at the request center.

The computing device 118 can be communicatively coupled with the interaction processing system 100 via a network 120. The network 120 can include any type of network that can support data communications using any of a variety of commercially-available protocols. In some examples, examples of the network 120 can include, without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. Merely by way of example, the network 120 connecting the computing device 118 and the interaction processing system 100 may be a local area network (LAN), such as one based on Ethernet, Token-Ring or the like. The network 120 also may be a wide-area network, such as the Internet, or may include financial/banking networks, telecommunication networks such as a public switched telephone networks (PSTNs), cellular or other wireless networks, satellite networks, television/cable networks, or virtual networks such as an intranet or an extranet. Infrared and wireless networks (e.g., using the Institute of Electrical and Electronics (IEEE) 802.11 protocol suite or other wireless protocols) also may be included in these communication networks.

In some examples, the computing device 118 can generate the interaction request 104 using input associated with the entity 110, such as from the computing device 118, for example through the network 120. The entity 110 can interact with the computing device 118, for example using a graphical user interface outputted by the computing device 118 to receive input from the entity 110. For example, the entity 110 may provide input to the computing device 118 in response to prompts outputted by the computing device 118 via the graphical user interface. Examples of the input can include verbal input, textual input, numerical input, touchscreen input, or a combination thereof. The prompts outputted by the computing device 118 can include auditory or visual prompts to direct the entity 110 to provide the input to the computing device 118. Once the computing device 118 receives the input, the computing device 118 then can generate the interaction request 104 based on the input. Through interacting with the computing device 118, the entity 110 can provide suitable input to initiate the interaction request 104.

Once the interaction processing system 100 receives the interaction request 104, the interaction processing system 100 can perform one or more actions based on the authorization of the interaction request 104. The interaction processing system 100 can use the interaction processing service 106 to determine the authorization of the interaction request 104, for example based on the request restriction 114 of the security profile 108. In some examples, the request restriction 114 may specify an authorized geographical location 122 with respect to the interaction request 104 that can render the interaction request 104 unauthorized or authorized. The request restriction 114 can specify the authorized geographical location 122 as a street address, zip code, postal code, city, state, province, country, geographical region, other suitable geographical identifiers, or a combination thereof.

Additionally or alternatively, the request restriction 114 may include a distance or radius to designate the authorized geographical location 122. For example, the authorized geographical location 122 can include at least one physical location 121 within a 15-mile (or other suitable) radius of a specific city or another suitable geographical identifier. The at least one physical location 121 can include one or more request centers associated with the interaction processing system 100 such that the interaction request 104 can be initiated in person. For example, the request centers may include a physical building that the entity 110 can enter to access the computing device 118 to initiate the interaction request 104. In some examples, the request restriction 114 may indicate an authorized geographical location 122. Alternatively, the request restriction 114 can indicate more than one authorized geographical location 122. In some examples, the authorization of the interaction 102 may vary based on a type of the interaction 102 such that the authorized geographical location 122 may be different for different types of the interaction 102. In implementations of banking or financial services systems, deposits can be a type of the interaction 102 allowable within a certain zip code, whereas withdrawals may be another type of the interaction 102 allowable at a particular request center.

The geographical location 116 of the interaction request 104 can be compared to the authorized geographical location 122 to determine the authorization of the interaction request 104. In some examples, the entity 110 may typically remain within the authorized geographical location such that restricting the authorization of the interaction request 104 to the authorized geographical location 122 can improve protection of the protected resources. For example, using the request restriction 114 to restrict the authorization of the interaction request 104 can prevent the protected resources from being accessed due to an interaction request 104 initiated outside of the authorized geographical location 122. In implementations of banking or financial services systems, the request restriction 114 can prevent financial transactions generated beyond the authorized geographical location 122 from being authorized, thereby improving fraud prevention.

If the interaction processing service 106 determines that the interaction 102 of the interaction request 104 is authorized, the interaction processing system 100 can initiate the interaction 102 to fulfill the interaction request 104. For example, if interaction 102 of the interaction request 104 involves a transaction, the interaction processing system 100 can initiate the interaction 102 by initiating a transfer of funds to or from an account associated with the entity 110. In some examples, the interaction processing system 100 may transmit an approval message to the entity 110 or an entity device 123 associated with the entity 110 to indicate that the interaction 102 has been initiated.

Alternatively, if the interaction processing service 106 determines that the interaction 102 of the interaction request 104 is unauthorized, the interaction processing system 100 can transmit a rejection notification 124 to the entity device 123 to indicate this result. Once the entity 110 receives the rejection notification 124 indicating that the interaction request 104 is unauthorized, the entity 110 may use the entity device 123 to adjust the request restriction 114. Adjusting the request restriction 114 can occur prior to and subsequent to initiating the interaction request 104 such that the entity 110 can control the authorization of the interaction request 104. In some examples, the entity device 123 may adjust the request restriction 114, subsequent to the entity 110 receiving the rejection notification 124, due to the request restriction 114 being mistakenly left as active. For example, the entity 110 may travel outside of the authorized geographical location 122 and can initiate an interaction request 104 using a computing device 118 positioned approximately outside of the authorized geographical location 122. Thus, the interaction processing system 100 can detect an adjustment 126 to the request restriction 114 initiated by the entity 110 to enable the interaction 102 to be authorized.

In some examples, the adjustment 126 to the request restriction 114 can be indicated by the entity 110 using a user interface 128 of the entity device 123 to access the security profile 108 of the entity 110, for example through a webpage or mobile application. As an illustrative example, the user interface 128 can include a toggle switch that can enable the entity 110 to adjust the request restriction 114 by interacting with the toggle button. Other examples of interactive elements in the user interface 128 can include dropdown menus, text boxes, radio buttons, checkboxes, or a combination thereof. Similar to adjusting the request restriction 114, the interaction processing system 100 may generate a request restriction 114 based on input received from the entity device 123, for example inputted by the entity 110 using the user interface 128 of the entity device 123. Once the interaction processing system 100 detects the adjustment 126 to the request restriction 114, the interaction processing service 106 can determine the authorization of the interaction request 104 based on the adjusted request restriction 114. If the interaction request 104 is now authorized based on the adjusted request restriction 114, the interaction processing system 100 can then initiate the interaction 102 associated with the interaction request 104.

Additionally or alternatively, the interaction processing system 100 may use the rejection notification 124 to challenge the interaction 102 instead of outright denying the interaction 102. In some examples, the interaction processing system 100 can use the rejection notification 124 to request an authentication 130 from the entity 110, for example to verify an identity 132 of the entity 110. For example, the interaction processing system 100 may request that the entity 110 provide multifactor authentication (MFA) as the authentication 130 to verify the identity 132 of the entity 110. Providing the MFA can involve inputting one or more authentication factors. Examples of the authentication factors can include a username, password, biometric marker, personal identification number (PIN), authentication code, one-time password authentication, or a combination thereof. In some examples, the entity device 123 may include an authenticator application installed on the entity device 123 to provide the MFA as the authentication 130 to the interaction processing system 100.

If the interaction processing system 100 can verify the identity 132 of the entity 110 using the authentication 130, the interaction processing system 100 may initiate the interaction 102 associated with the interaction request 104. Otherwise, the interaction processing system 100 may deny the interaction request 104 to prevent the interaction 102 from being initiated. When the interaction processing system 100 denies the interaction request 104, the interaction processing system 100 may transmit a warning notification 134 to the entity device 123 to alert the entity 110 regarding the interaction request 104 that may be unauthorized. In some examples, the interaction processing system 100 may transmit the warning notification 134 based on a verified contact preference 136 indicated by the entity 110. For example, the verified contact preference 136 can indicate that the entity 110 may prefer communication via email, phone call, or text messaging. Additionally, the verified contact preference 136 can indicate a specific email address or phone number to use to transmit the warning notification 134 to the entity 110. Transmitting the warning notification 134 based on the verified contact preference 136 may improve a likelihood of the entity 110 receiving the warning notification 134 such that the entity 110 can address the interaction request 104 that may be unauthorized.

In some examples, the interaction processing system 100 may execute an artificial intelligence (AI) module 138 to identify fraudulent activity 140 based on the interaction 102 being unauthorized. In some examples, the AI module 138 can be trained to identify the fraudulent activity 140 using a machine-learning model 142 that can analyze activity data 144 from the interaction processing service 106. In some examples, more than one machine-learning model may be used to analyze the activity data 144. Machine learning is a branch of AI that uses models to learn from, categorize, and make predictions about data. Such models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusters, such as k-means clusters, mean-shift clusters, and spectral clusters; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Machine-learning models can be constructed through an at least partially automated (e.g., with little or no human involvement) process called training. During training, training data can be iteratively supplied to the machine-learning model 142 to enable the machine-learning model 142 to identify patterns related to the training data or to identify relationships between the training data and output data. For example, the machine-learning model 142 can be trained to identify whether the interaction 102 or the interaction request 104 fits typical entity behavior based on the training data. In some examples, the training data can be acquired by the interaction processing service 106, constructed from various subsets of data, or input by a trainer. The various subsets of data can include data from one or more previous interactions, theoretical data for a future interaction, or a combination of these. As more interaction requests are received over time, the training data can be updated for further tuning the machine-learning model 142.

After analyzing the activity data 144 using the machine-learning model 142, the interaction processing system 100 can determine whether the interaction 102 is fraudulent. As an illustrative example, the machine-learning model 142 may use the training data to determine that the entity 110 typically remains within an approximate geographical location or radius. The machine-learning model 142 then may flag any interaction request initiated outside of the approximate geographical location. For example, the machine-learning model 142 may output a confidence score to represent a likelihood of the interaction 102 or the interaction request 104 being fraudulent. Examples of the confidence score can include a percentage, decimal, integer, or other suitable quantitative measurements. In such examples, the confidence score may range from 0% to 100% with 0% representing a negligible likelihood of the interaction 102 being fraudulent. When the confidence score is above a predetermined threshold, such as 70%, the interaction processing system 100 can transmit the warning notification 134 to alert the entity 110 regarding the fraudulent activity 140 associated with the interaction request 104. As described above, the interaction processing system 100 can use the verified contact preference 136 indicated by the entity 110 to transmit the warning notification 134 to the entity 110. The interaction processing system 100 may set the predetermined threshold based on input from an administrator or developer. Additionally or alternatively, the interaction processing system 100 may identify a sensitivity indicated by the entity 110 with respect to being alerted about the fraudulent activity 140. Based on this sensitivity, the interaction processing system 100 can determine a suitable threshold associated with the confidence score.

Although FIG. 1 illustrates a particular number and arrangement of components, FIG. 1 is intended to be illustrative and non-limiting. Other examples may include more components, fewer components, different components, or a different arrangement of the components shown in FIG. 1. For instance, the activity data 144 may be stored external to the interaction processing service 106, such as in the AI module 138. Any suitable arrangement of the depicted components is contemplated herein.

Figure 2:
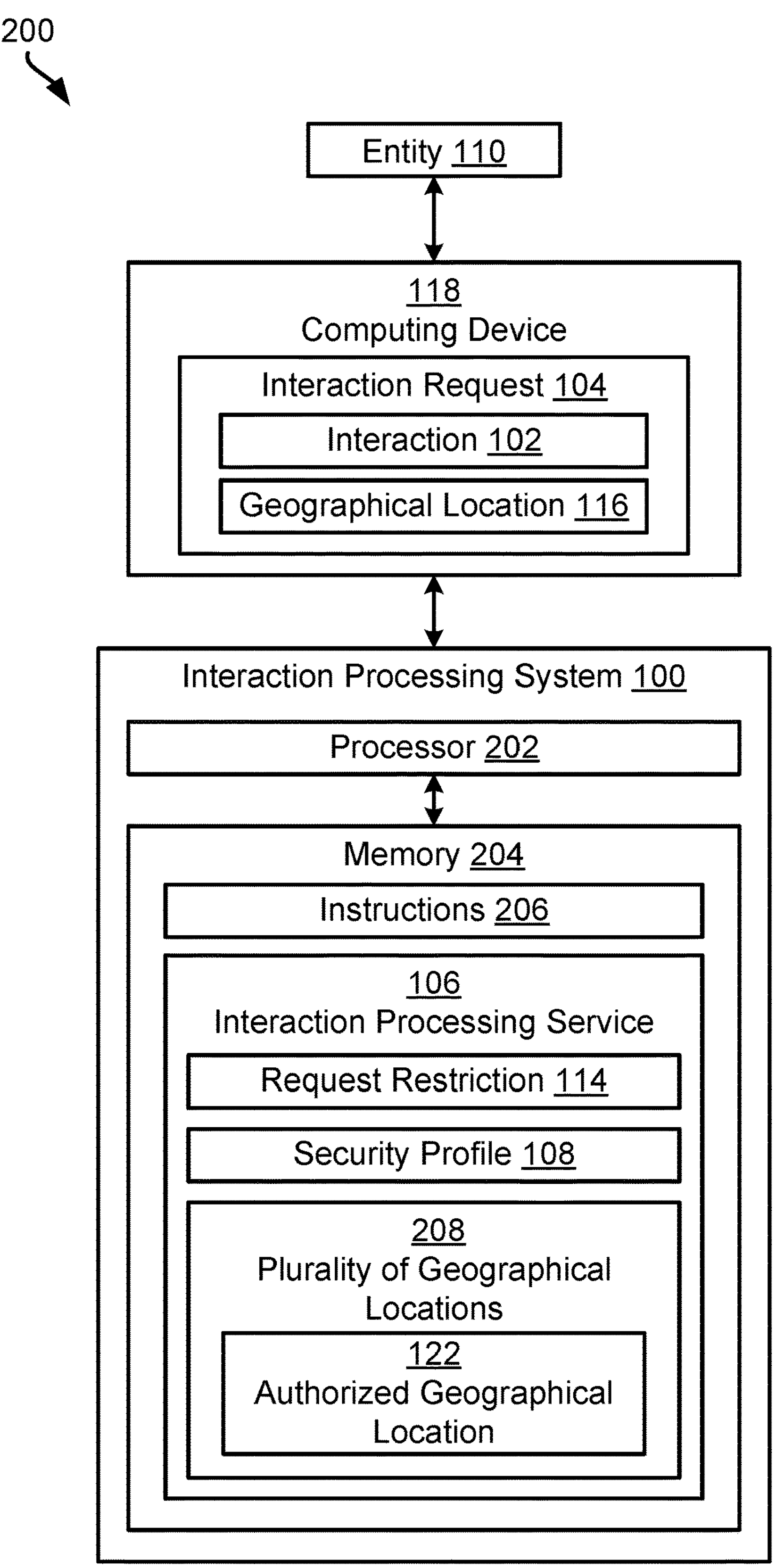
FIG. 2 is a block diagram of an example of a computing device for controlling an interaction using location-based indicators according to one example of the present disclosure.

FIG. 2 is a block diagram of an example of a computing device 200 for controlling an interaction 102 using location-based indicators to authenticate an interaction request 104 associated with the interaction 102 according to one example of the present disclosure. The computing device 200 may be a network device and may include a processor 202, a memory 204, and other suitable components. In some examples, the components illustrated in FIG. 2 may be integrated into a single structure. For example, the components can be within a single housing. In other examples, the components illustrated in FIG. 2 can be distributed, for example in separate housings and in electrical communication with each other.

The processor 202 may execute one or more operations for implementing various examples and embodiments described herein. The processor 202 can execute instructions stored in the memory 204 to perform the operations. The processor 202 can include one processing device or multiple processing devices. Non-limiting examples of the processor 202 include a Field-Programmable Gate Array ("FPGA"), an application-specific integrated circuit ("ASIC"), a microprocessor, etc.

The processor 202 may be communicatively coupled with the memory 204 via a bus. The non-volatile memory 204 may include any type of memory device that can retain stored information when powered off. Non-limiting examples of the memory 204 include electrically erasable and programmable read-only memory ("EEPROM"), flash memory, or any other type of non-volatile memory. In some examples, at least some of the memory 204 may include a medium from which the processor 202 can read instructions. A non-transitory computer-readable medium may include electronic, optical, magnetic, or other storage devices capable of providing the processor 202 with computer-readable instructions or other program code executable to perform operations. Non-limiting examples of a computer-readable medium include magnetic disk(s), memory chip(s), ROM, random-access memory ("RAM"), an ASIC, a configured processor, optical storage, or any other medium from which a computer processor may read instructions. The instructions 206 may include processor-specific instructions generated by a compiler or an interpreter from code written in any suitable computer-programming language, including, for example, C, C++, C#, Java, Perl, Python, etc.

For example, once the processor 202 receives the interaction request 104 initiated by an entity 110, the processor 202 may execute an interaction processing service 106 to verify the interaction request 104. In some examples, the processor 202 can identify the request restriction 114 associated with a security profile 108 of the entity 110. The processor 202 can use the request restriction 114 to determine an authorized geographical location 122 of a plurality of geographical locations 208 indicated by the entity 110. In some examples, the processor 202 may create the request restriction 114 using preferences indicated by the entity 110, such as using an entity device 123 associated with the entity 110. The request restriction 114 can be associated with one or more location-based indicators that can correspond to the authorized geographical location 122 with respect to the interaction request 104. For example, the request restriction 114 may challenge or deny the interaction 102 of the interaction request 104 due to the interaction request 104 being generated outside of the authorized geographical location 122 indicated by the request restriction 114.

Based on the request restriction 114, the processor 202 can determine whether the interaction request 104 is authorized or unauthorized. If the geographical location 116 is not consistent with the authorized geographical location 122, the processor 202 may challenge the interaction 102 associated with the interaction request 104. The authorized geographical location 122 can be indicated using a geographical identifier, such as a street address, city, zip code, state, province, or country. The geographical location 116 can be compared to the authorized geographical location 122 such that the interaction request 104 can be rendered unauthorized if the geographical location 116 is outside of the authorized geographical location 122. Alternatively, if the geographical location 116 is consistent with the authorized geographical location 122, the processor 202 can initiate the interaction 102 associated with the interaction request 104.

FIG. 3 is a flowchart of a process 300 for controlling an interaction 102 using location-based indicators to authenticate an interaction request 104 associated with the interaction 102 according to one example of the present disclosure. In some examples, the processor 202 can perform one or more of the steps shown in FIG. 3. In other examples, the processor 202 can implement more steps, fewer steps, different steps, or a different order of the steps depicted in FIG. 3. The steps of FIG. 3 are described below with reference to components discussed above in FIGS. 1-2.

At block 302, the processor 202 receives an interaction request 104 associated with a geographical location 116. The interaction request 104 can be initiated by a computing device 118, such as through input provided by an entity 110 associated in response to prompts outputted by the computing device 118. For example, if the computing device 118 is a laptop or a mobile device, the computing device 118 can be used by the entity 110 to provide keystrokes or touchscreen input to initiate the interaction request 104. In implementations of banking or financial services systems, the computing device 118 can be used to initiate an interaction request 104 to transfer funds or fulfill a service request (e.g., changing a card PIN). In such examples, the computing device 118 may be an automated teller machine (ATM) that can facilitate financial deposits or withdrawals as the interaction request 104. The ATM can be positioned approximately at the geographical location 116, such as within or adjacent to a request center accessible by the entity 110 to initiate the interaction request 104.

At block 304, in response to receiving the interaction request 104, the processor 202 identifies a request restriction 114 associated with a security profile 108 of the entity 110 by executing an interaction processing service 106. The request restriction 114 can be used to identify an authorized geographical location 122 of a plurality of geographical locations 208. The authorized geographical location 122 can include a radius or a range with respect to distance from a geographical identifier (e.g., a street address, city, postal code, etc.). For example, the processor 202 may use the request restriction to determine that an interaction request 104 generated at a request center associated with the geographical location 116 can be authorized. In some examples, the interaction request 104 generated at the request center may be initiated by a worker associated with the request center using the computing device 118 and input provided by the entity 110.

Executing the interaction processing service 106 can involve using the interaction processing service 106 to access and search the security profile 108 of the entity 110 for the request restriction 114. In some examples, the request restriction 114 may be tagged (e.g., using metadata) to enable the interaction processing service 106 to search the security profile 108 for the request restriction 114 relatively efficiently. For example, the processor 202 may identify the request restriction 114 after using the interaction processing service 106 and an entity identifier 112 associated with the entity 110 to determine the security profile 108 of the entity 110.

The request restriction 114 can be set by the entity device 123, for example using input received from the entity 110 via an application installed on the entity device 123. In such examples, the entity device 123 may display a user interface 128 that the entity 110 can interact with to indicate the request restriction 114, for example using a graphical control element of the user interface 128. Examples of interacting with the graphical control element can include toggling a switch, selecting one or more check boxes, selecting a radio button, providing text input in a text box or a combo box, adjusting a slider, making a selection from a dropdown menu, or other suitable interaction with the user interface 128. In some examples, the user interface 128 may provide other options to control the interaction 102 in addition to using the location-based indicators associated with the geographical location 116 of interaction request 104. For example, the other options to control the interaction 102 can include communication-based indicators corresponding to a communication channel, such as interactive voice response (IVR).

At block 306, the processor 202 challenges the interaction 102 associated with the interaction request 104 in response to determining that the interaction request 104 is unauthorized. In some examples, the processor 202 may challenge the interaction 102 in response to determining that the geographical location 116 of the interaction request 104 is not consistent with the authorized geographical location 122 based on the request restriction 114. Challenging the interaction 102 may decrease a likelihood of initiating a fraudulent interaction by requesting authentication 130 from the entity 110. In some examples, in response to challenging the interaction 102, the processor 202 may transmit a rejection notification 124 to the entity 110 to request the authentication 130 from the entity 110 to verify an identity 132 of the entity 110. Examples of the authentication 130 can include single-factor or multifactor authentication. The authentication 130 can be provided by the entity 110 using the entity device 123, for example using an authenticator application or other suitable authentication software installed on the entity device 123. If the processor 202 verifies the identity 132 of the entity 110 using the authentication provided by the entity 110, the processor 202 may proceed to block 308 to initiate the interaction 102.

In some examples, if the processor 202 is unable to verify the identity 132 of the entity 110 after receiving the authentication 130, the processor 202 may transmit a warning notification 134 to the entity 110. The warning notification 134 can be used to alert the entity 110 regarding the interaction request 104 that may be unauthorized, for example causing the entity 110 to realize that the request restriction 114 is mistakenly enabled. In such examples, the request restriction 114 then can be adjusted (e.g., disabled or toggled off) by the entity 110 to enable initiation of the interaction 102. For example, a user interface 128 can be outputted by the entity device 123 that may enable the entity 110 to adjust the request restriction 114. Once the processor 202 detects an adjustment 126 to the request restriction 114, the processor 202 can return to block 304 to identify the adjusted request restriction 114 using the interaction processing service 106. If the adjusted request restriction 114 authorizes the interaction request 104, the processor 202 may proceed to block 308 to initiate the interaction 102. Otherwise, the processor 202 may proceed to block 306 to challenge the interaction 102.

At block 308, in response to determining that the geographical location 116 of the interaction request 104 is consistent with the authorized geographical location 122 based on the request restriction 114, the processor 202 initiates the interaction 102 associated with the interaction request 104. For example, if the geographical location 116 of the request restriction 114 is within the authorized geographical location 122, the processor 202 can authorize the interaction request 104 and initiate the interaction 102. Alternatively, if the geographical location 116 is outside of the authorized geographical location 122 but is disabled, the processor 202 may similarly authorize the interaction request 104 and initiate the interaction 102.

As an illustrative example, the processor 202 may receive a fund transfer request from the computing device 118 as the interaction request 104 to transfer resources from an account associated with the entity 110 to a different account. In some examples, the different account may be associated with the entity 110. Alternatively, the different account can be associated with a different entity (e.g., a client, service provider, etc.). Once the processor 202 receives the fund transfer request, the processor 202 can access the security profile 108 associated with the entity 110 to identify a request restriction 114 corresponding to the fund transfer request. In some examples, the request restriction 114 may render the fund transfer request unauthorized due to the geographical location 116 of the interaction request 104 being inconsistent with the authorized geographical location 122. The processor 202 then may challenge a resource transfer associated with the fund transfer request such that the processor 202 may deny the resource transfer or may request additional verification from the entity 110. If the request restriction 114 renders the fund transfer request authorized, the processor 202 can initiate the resource transfer such that the resources can be transferred from the account associated with the entity 110 to the different account.

Although the subject matter has been described in language specific to structural features or methodological acts, it is to be understood that the subject matter defined in the appended claims is not necessarily limited to the specific features or acts described above. Rather, the specific features and acts described above are disclosed only for the purpose of illustration and description and they are not intended to be exhaustive or to limit the disclosure to the precise forms disclosed. Modifications, adaptations, and uses thereof will be apparent to those skilled in the art without departing from the scope of the disclosure. For instance, any examples described herein can be combined with any other examples.

The invention claimed is:

1. A system comprising:

a processor; and a memory including instructions that are executable by the processor for causing the processor to perform operations comprising:

receiving an interaction request associated with a geographical location, the interaction request being initiated by an entity approximately at the geographical location;

in response to receiving the interaction request, identifying a request restriction associated with a security profile of the entity by executing an interaction processing service, the request restriction usable to identify an authorized geographical location of a plurality of geographical locations;

executing an artificial intelligence (AI) model to determine whether the geographical location is consistent with the authorized geographical location, wherein the AI model is trained, using data about previous interactions associated with the entity, to determine one or more radii around one or more geographic locations within which the entity is likely to be located, and wherein executing the AI model comprises providing the geographical location to the AI model to cause the AI model to generate output comprising a score indicating a likelihood that the entity is within a predetermined radius of the geographical location;

in response to determining, based on the output from the AI model, that the geographical location of the interaction request is not consistent with the authorized geographical location based on the request restriction, challenging an interaction associated with the interaction request, wherein challenging the interaction comprises transmitting a warning notification to the entity using a verified contact preference, and wherein the warning notification is configured to alert the entity regarding the geographical location of the interaction request being inconsistent with the authorized geographical location; and in response to determining, based on the output from the AI model, that the geographical location of the interaction request is consistent with the authorized geographical location based on the request restriction, initiating the interaction associated with the interaction request.

2. The system of claim 1, wherein the operations further comprise, in response to challenging the interaction associated with the interaction request:

transmitting a rejection notification to an entity device associated with the entity, wherein the rejection notification is configured to request an authentication from the entity that is usable to verify an identity of the entity;

verifying the identity of the entity using the authentication received from the entity; and in response to verifying the identity of the entity, initiating the interaction associated with the interaction request.

3. The system of claim 1, wherein the geographical location includes at least one physical location accessible by the entity to initiate the interaction request.

4. The system of claim 1, wherein the request restriction is adjustable by the entity using an entity device associated with the entity prior to and subsequent to initiating the interaction request, and wherein the operations further comprise, subsequent to identifying the request restriction associated with the security profile of the entity:

determining that the geographical location of the interaction request renders the interaction request unauthorized based on the authorized geographical location of the request restriction;

detecting an adjustment to the request restriction, wherein the adjustment is indicatable by the entity using a user interface of the entity device to access the security profile of the entity; and in response to detecting the adjustment, determining that the geographical location of the interaction request renders the interaction request authorized based on the adjusted request restriction.

5. The system of claim 1, wherein executing the interaction processing service further comprises:

determining the security profile of the entity using an entity identifier associated with the entity, wherein the security profile includes the request restriction associated with controlling the interaction based on the geographical location of the interaction;

identifying the authorized geographical location based on the request restriction; and determining whether the authorized geographical location of the request restriction is consistent with the geographical location of the interaction request.

6. A computer-implemented method comprising:

receiving an interaction request associated with a geographical location, the interaction request being initiated by an entity approximately at the geographical location;

in response to receiving the interaction request, identifying a request restriction associated with a security profile of the entity by executing an interaction processing service, the request restriction usable to identify an authorized geographical location of a plurality of geographical locations;

executing an artificial intelligence (AI) model to determine whether the geographical location is consistent with the authorized geographical location, wherein the AI model is trained, using data about previous interactions associated with the entity, to determine one or more radii around one or more geographic locations within which the entity is likely to be located, and wherein executing the AI model comprises providing the geographical location to the AI model to cause the AI model to generate output comprising a score indicating a likelihood that the entity is within a predetermined radius of the geographical location;

in response to determining, based on the output of the AI model, that the geographical location of the interaction request is not consistent with the authorized geographical location based on the request restriction, challenging an interaction associated with the interaction request, wherein challenging the interaction comprises transmitting a warning notification to the entity using a verified contact preference, and wherein the warning notification is configured to alert the entity regarding the geographical location of the interaction request being inconsistent with the authorized geographical location; and in response to determining, based on the output from the AI model, that the geographical location of the interaction request is consistent with the authorized geographical location based on the request restriction, initiating the interaction associated with the interaction request.

7. The computer-implemented method of claim 6, further comprising, in response to challenging the interaction associated with the interaction request:

transmitting a rejection notification to an entity device associated with the entity, wherein the rejection notification is configured to request an authentication from the entity that is usable to verify an identity of the entity;

verifying the identity of the entity using the authentication received from the entity; and in response to verifying the identity of the entity, initiating the interaction associated with the interaction request.

8. The computer-implemented method of claim 6, wherein the geographical location includes at least one physical location accessible by the entity to initiate the interaction request.

9. The computer-implemented method of claim 8, wherein the request restriction is adjustable by the entity using an entity device associated with the entity prior to and subsequent to initiating the interaction request, and further comprising, subsequent to identifying the request restriction associated with the security profile of the entity:

determining that the geographical location of the interaction request renders the interaction request unauthorized based on the authorized geographical location of the request restriction;

detecting an adjustment to the request restriction, wherein the adjustment is indicatable by the entity using a user interface of the entity device to access the security profile of the entity; and in response to detecting the adjustment, determining that the geographical location of the interaction request renders the interaction request authorized based on the adjusted request restriction.

10. The computer-implemented method of claim 6, wherein executing the interaction processing service further comprises:

determining the security profile of the entity using an entity identifier associated with the entity, wherein the security profile includes the request restriction associated with controlling the interaction based on the geographical location of the interaction;

identifying the authorized geographical location based on the request restriction; and determining whether the authorized geographical location of the request restriction is consistent with the geographical location of the interaction request.

11. A non-transitory computer-readable medium comprising program code executable by a processing device for causing the processing device to perform operations comprising:

receiving an interaction request associated with a geographical location, the interaction request being initiated by an entity approximately at the geographical location;

in response to receiving the interaction request, identifying a request restriction associated with a security profile of the entity by executing an interaction processing service, the request restriction usable to identify an authorized geographical location of a plurality of geographical locations;

executing an artificial intelligence (AI) model to determine whether the geographical location is consistent with the authorized geographical location, wherein the AI model is trained, using data about previous interactions associated with the entity, to determine one or more radii around one or more geographic locations within which the entity is likely to be located, and wherein executing the AI model comprises providing the geographical location to the AI model to cause the AI model to generate output comprising a score indicating a likelihood that the entity is within a predetermined radius of the geographical location;

in response to determining, based on the output of the AI model, that the geographical location of the interaction request is not consistent with the authorized geographical location based on the request restriction, challenging an interaction associated with the interaction request, wherein challenging the interaction comprises transmitting a warning notification to the entity using a verified contact preference, and wherein the warning notification is configured to alert the entity regarding the geographical location of the interaction request being inconsistent with the authorized geographical location; and in response to determining, based on the output from the AI model, that the geographical location of the interaction request is consistent with the authorized geographical location based on the request restriction, initiating the interaction associated with the interaction request.

12. The non-transitory computer-readable medium of claim 11, wherein the operations further comprise, in response to challenging the interaction associated with the interaction request:

transmitting a rejection notification to an entity device associated with the entity, wherein the rejection notification is configured to request an authentication from the entity that is usable to verify an identity of the entity;

verifying the identity of the entity using the authentication received from the entity; and in response to verifying the identity of the entity, initiating the interaction associated with the interaction request.

13. The non-transitory computer-readable medium of claim 11, wherein the geographical location includes at least one physical location accessible by the entity to initiate the interaction request.

14. The non-transitory computer-readable medium of claim 11, wherein the request restriction is adjustable by the entity using an entity device associated with the entity prior to and subsequent to initiating the interaction request, and wherein the operations further comprise, subsequent to identifying the request restriction associated with the security profile of the entity:

determining that the geographical location of the interaction request renders the interaction request unauthorized based on the authorized geographical location of the request restriction;

detecting an adjustment to the request restriction, wherein the adjustment is indicatable by the entity using a user interface of the entity device to access the security profile of the entity; and in response to detecting the adjustment, determining that the geographical location of the interaction request renders the interaction request authorized based on the adjusted request restriction.

15. The system of claim 1, wherein the operations further comprise:

comparing the score indicating the likelihood that the entity is within the predetermined radius of the geographical location with a threshold confidence score;

determining, based on the score not exceeding the threshold confidence score, that the entity is not within the predetermined radius of the geographical location; and adjusting the interaction request by applying a tag to the interaction request that indicates that the entity is not within the predetermined radius of the geographical location.

* * * * *